US008496886B2

(12) United States Patent
Grochowski

(10) Patent No.: US 8,496,886 B2
(45) Date of Patent: Jul. 30, 2013

(54) FLUID TREATMENT SYSTEM WITH BULK MATERIAL BEDS OPERATED IN PARALLEL AND METHOD FOR OPERATING SUCH A SYSTEM

(76) Inventor: Horst Grochowski, Oberhausen (DE)

( * ) Notice: Subject to any disclaimer, the term of this patent is extended or adjusted under 35 U.S.C. 154(b) by 0 days.

(21) Appl. No.: 13/464,437

(22) Filed: May 4, 2012

(65) Prior Publication Data

US 2012/0216873 A1  Aug. 30, 2012

Related U.S. Application Data

(63) Continuation of application No. 12/742,400, filed as application No. PCT/EP2008/009557 on Nov. 12, 2008, now abandoned.

(30) Foreign Application Priority Data

Nov. 12, 2007  (DE) .......................... 10 2007 054 212
May 15, 2008  (WO) ................. PCT/EP2008/003910

(51) Int. Cl.
| | |
|---|---|
| *B01J 8/08* | (2006.01) |
| *B01J 8/00* | (2006.01) |
| *B01J 8/02* | (2006.01) |
| *B01J 8/18* | (2006.01) |
| *B01J 35/02* | (2006.01) |
| *B01J 19/00* | (2006.01) |
| *F27B 15/00* | (2006.01) |
| *B01D 47/00* | (2006.01) |

(52) U.S. Cl.
USPC ...................................................... 422/219

(58) Field of Classification Search
USPC ................. 422/129, 139–142, 145, 187, 211, 422/213, 219; 423/210, 213.2
See application file for complete search history.

(56) References Cited

U.S. PATENT DOCUMENTS

| | | | |
|---|---|---|---|
| 2,423,411 | A | 7/1947 | Simpson |
| 2,491,446 | A | 12/1949 | Hagerbaumer |

(Continued)

FOREIGN PATENT DOCUMENTS

| | | |
|---|---|---|
| DE | 3916325 A1 | 11/1990 |
| EP | 0257654 A2 | 3/1988 |

(Continued)

OTHER PUBLICATIONS

Machine translation of EP 823278 A2, which was published on Feb. 11, 1998.*

*Primary Examiner* — Jill Warden
*Assistant Examiner* — Natasha Young
(74) *Attorney, Agent, or Firm* — Rankin, Hill & Clark LLP

(57) ABSTRACT

A fluid treatment system having bulk beds. The fluid to be treated essentially streams from the bottom up through a bulk bed, while the bulk material migrates through the bulk beds in countercurrent to the fluid essentially from the top down. This is accomplished by removing partial quantities of bulk material at the lower end of the bulk bed, and delivering partial quantities of the bulk material to the bulk bed at the top. At least one charging wagon provided with optionally sealable bulk material outlets is able to traverse a charging channel between a charging position and several partial bulk bed release positions above the bulk beds. Provided below the bulk material outlets and the bulk material valve of the charging wagon are bulk material through pipes, the bulk material outlet mouths of which end on bulk material cones of an underlying bulk bed.

31 Claims, 14 Drawing Sheets

U.S. PATENT DOCUMENTS

| | | | |
|---|---|---|---|
| 5,289,954 A * | 3/1994 | Bruggendick et al. | 222/409 |
| 5,344,616 A | 9/1994 | Bruggendick | |
| 5,441,704 A * | 8/1995 | Grochowski | 422/145 |
| 5,603,907 A | 2/1997 | Grochowski | |
| 7,198,767 B1 | 4/2007 | Grochowski | |
| 2005/0118260 A1 * | 6/2005 | Bailey et al. | 424/464 |

FOREIGN PATENT DOCUMENTS

| | | |
|---|---|---|
| EP | 0357653 B1 | 3/1990 |
| EP | 823278 A2 * | 2/1998 |
| EP | 1529561 A1 | 5/2005 |
| WO | 01/17663 A1 | 3/2001 |

* cited by examiner

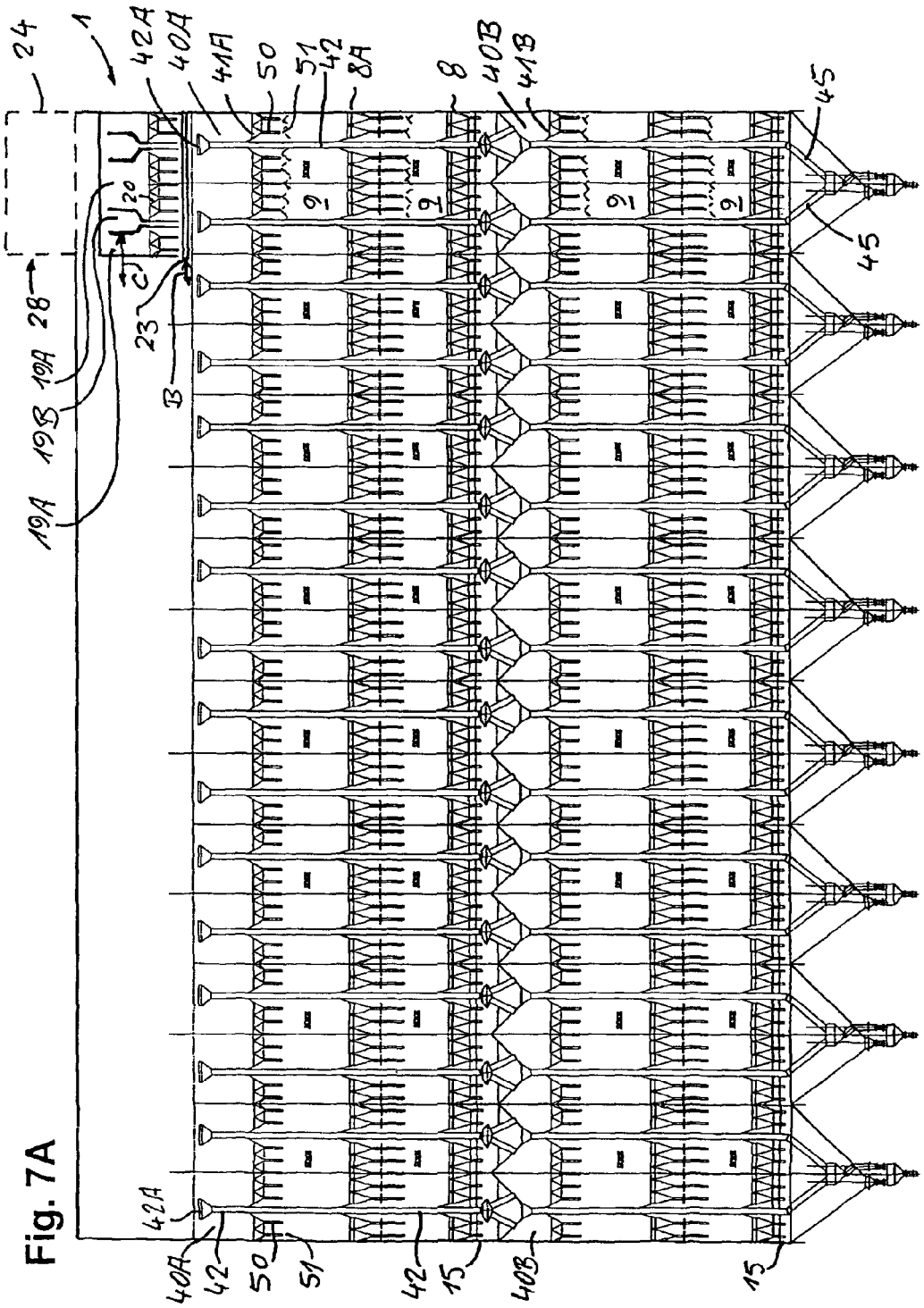

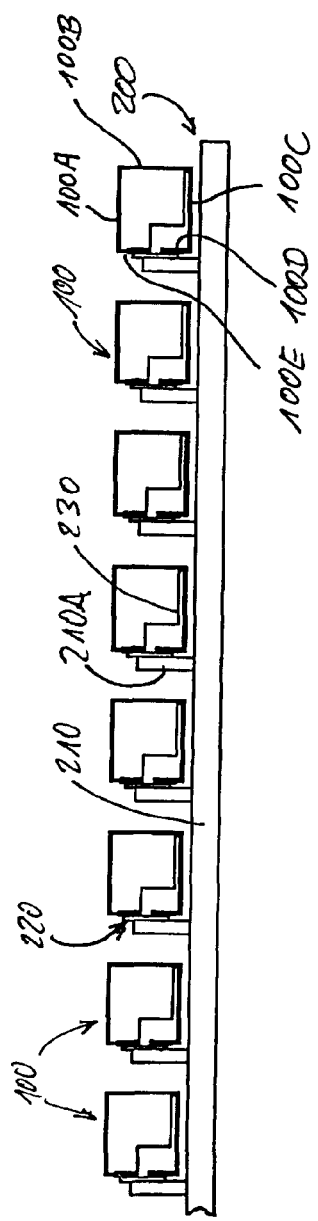
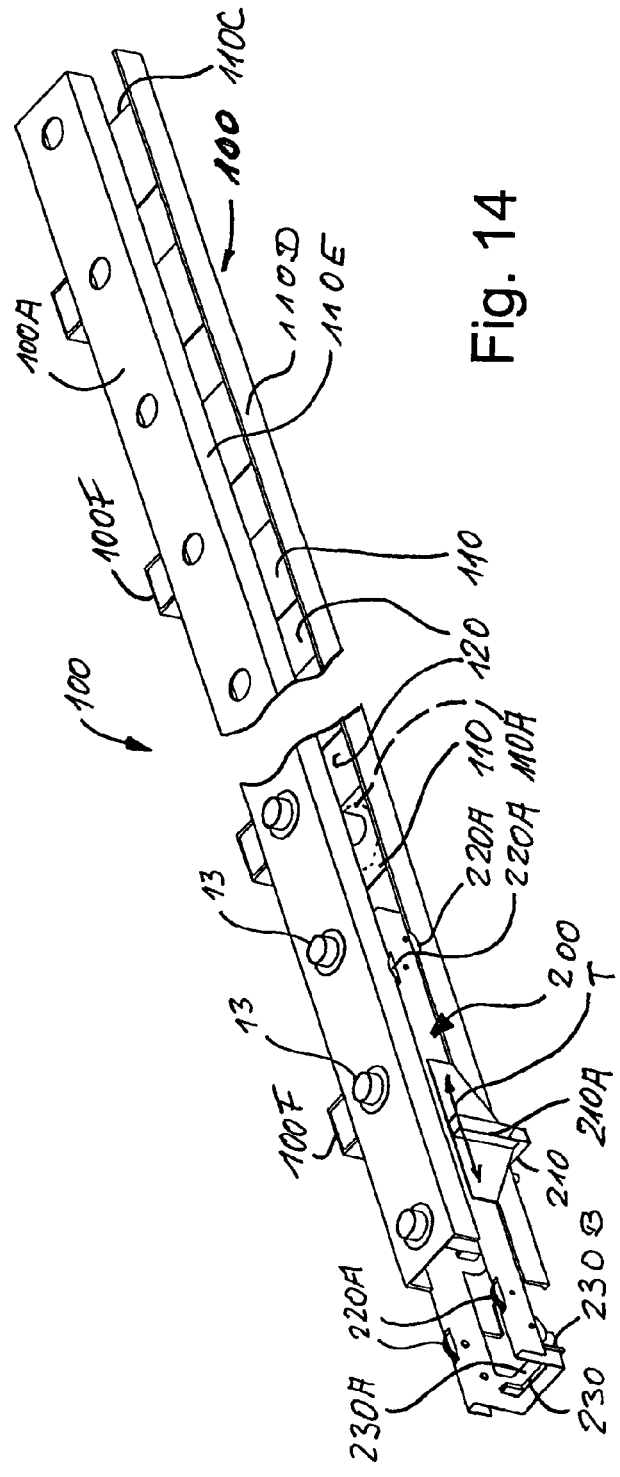

US 8,496,886 B2

FLUID TREATMENT SYSTEM WITH BULK MATERIAL BEDS OPERATED IN PARALLEL AND METHOD FOR OPERATING SUCH A SYSTEM

This application is a continuation of U.S. Non-provisional patent application Ser. No. 12/742,400 filed May 11, 2010 (still pending), which in turn is a National Stage of International Application No. PCT/EP2008/009557, filed Nov. 12, 2008 (expired), which in turn claims priority to German Application No. 102007054212.9, Filed Nov. 12, 2007 and to International Application No. PCT/EP2008/003910, Filed May 15, 2008, all of which are incorporated by reference herein as if contained in this specification.

AREA OF THE INVENTION

The invention relates to a fluid treatment system with parallel-operated bulk as well as a method for operating such a system. The fluid to be treated here essentially streams from the bottom up through each bulk bed in the bulk beds arranged parallel next to each other, while the bulk material flows in a countercurrent to the fluid, passing through the fluid bed essentially from the top down. To this end, partial quantities of bulk material are removed at the lower end of the bulk bed, and correspondingly large partial quantities of bulk material are delivered at the bulk bed at the top end of the bulk bed. In particular, the invention relates to such generic fluid treatment systems in which the bulk beds are connected with each other by a shared horizontal charging channel in such a way that at least one charging wagon can traverse the charging channel between a charging position and several partial bulk bed release positions above the bulk beds. Additionally or alternatively to a charging channel, it can be provided that the bulk beds are connected with each other by a shared horizontal bulk material discharge channel, wherein a travel drive can be used to remove the bulk material from the fluid treatment system via the discharge channel.

TECHNOLOGICAL BACKGROUND

Fluid treatment systems of the kind mentioned at the outset are known from WO 2001/017663 of the applicant. As evident from the FIG. 1 representing this prior art, the known fluid treatment system 1' encompasses a tubular channel 2', depicted on FIG. 1 in section, transverse to its longitudinal axis, and a plurality of migrating bed reactor modules 3' arranged in tandem inside the tubular channel 2'. A feed channel 4' situated below for untreated fluid along with a discharge channel 5' lying over it run parallel to a lateral wall of the tubular channel 2'. The fluid to be treated flows via a laterally situated, if necessary sealable, feed window 6' in a gas distribution room 12' under a feed floor 8' into each reactor module. By way of the feed floor 8' known from EP 0257654 B1, the fluid to be treated arrives in a horizontally extended bulk bed 9' of roughly uniform height, which consists of adsorptively or absorptively or catalytically active bulk particles, for example. Located above the bulk bed 9' under the tubular channel cover 10' is a continuous charging channel 11', in which the treated fluid can accumulate before exiting through lateral, if necessary sealable, discharge windows 7' of the migrating bed reactor module 3' and removed from the fluid treatment system 1' via the discharge channel 5'.

In order to gradually replenish the bulk material of the bulk bed 9', consumed bulk material is occasionally removed at the lower end, and fresh bulk material is again supplied at the top end, so that the bed height remains constant. The incremental removal of bulk material takes place in a known manner via the feed floor 8', the bulk material discharge pipes 13' of which can be opened and then closed again via a bulk material discharge device 15' known in the art. To this end, at least one discharge finger 15B' each above a horizontal baffle plate 15A' can be moved horizontally through the gap space between the baffle plate 15A' and accompanying bulk material discharge pipes 13' up to the lateral edges 15C' of the baffle plate 15A'. As a result, the bulk material is discarded from the baffle plate, and a corresponding amount of bulk material slides down from above out of each bulk material discharge tub 13'. Removed bulk material can be discharged by means of a bulk material discharge wagon 16' or a conveyor belt running along the tubular channel 2'.

In order to be able to supply an additional, equally large quantity of fresh bulk material for sustaining the bed height at the same time the bulk material is being removed, a charging wagon 19' is provided that uses a traveling mechanism 18' to traverse along the tubular channel 2' within the latter. On FIG. 1, the charging wagon 19' is just above the migrating bed reactor module. The charging wagon 19' is tub-shaped, and provided with a plurality of discharge funnels 20' arranged in the form of a grid, which pass over into bulk material outlet pipes 14' at their lower end. Located below the lower mouths 21' of the bulk material outlet pipes 14' is a horizontally extending dust plate, which serves as a bulk material valve 23', and for this purpose is perforated with holes in the respective positions of the mouth ends of the bulk material outlet pipes. The dust plate can be shifted horizontally around roughly one width of a hole, so that when in its second sliding position, it seals the mouth ends of the bulk material outlet pipes 14'. This makes it possible for the charging wagon 19' to traverse each of the migrating bed reactor modules 3' arranged in tandem in the tubular channel 2', so as to there effect an exchange of bulk material. If the charging wagon 19' is now moved along the charging channel 11', the dust plate interrupts the flow of fluid at the upper end of the bulk bed 9' over which the charging wagon 19' is traveling at the time, and the dust plate grinds over the tips of the bulk material cones that form as refilling takes place at the upper limit of the bulk bed 9'.

The uniformity with which the bulk material migrates through the bulk beds is of great importance for the technical effect and efficiency of such a counter-current fluid treatment procedure. For this reason, special discharge devices 15' are used under each bulk bed, which withdraw practically the same quantity of bulk material per outlet from each of the most often numerous bulk material removal pipes cyclically in each working stroke. The bulk material discharge devices used with great success for this purpose are known from EP 0 357 653 B1. In this known bulk material discharge device, a striated, continuous baffle surface with a constant width in the form of a transverse leg of a U or T-carrier is arranged underneath a series of adjacently arranged mouth openings of the bulk material removal pipes. A finger-shaped rod 15B' arranged parallel to the series of pipes, and hence also parallel to the oblong baffle surface, fits undersized between the baffle surface and tubular mouths, and can be moved by a drive cyclically and reversibly from its faces between the lateral edges 15C' of the baffle surface, transversely to their longitudinal extension. In each of these movements, bulk material backed up under the pipe mouth on the baffle surface is thrown over the lateral edge of the baffle surface into a collection tank situated below. The latter can be a funnel arrangement separate for each migrating bed reactor module 9', a bulk material discharge wagon 16', which travels in a bulk material discharge channel through a plurality of bulk material reactor modules, or also a conveyor belt. The long-term functional capacity of these discharge devices has for 20 years served as a guarantee for the flawless function of generic fluid treatment systems. Material properties limit the length of these discharge devices, so that an independently powered discharge device is normally used for each bulk bed (migrating bed reactor module).

DESCRIPTION OF THE INVENTION

The object of the invention is to further develop the known fluid treatment systems in such a way as to improve the process variability of a generic fluid treatment system by comparison to the described prior art, without having to sacrifice the advantages of a traversable charging wagon.

More particularly, provided is a fluid treatment system, comprising several parallel-operated bulk beds arranged one next to the other, in which the fluid to be treated essentially streams from the bottom up through a bulk bed, and the bulk material migrates through the bulk bed in countercurrent to the fluid essentially from the top down, in that partial quantities of bulk material are removed at the lower end of the bulk bed, and partial quantities of the bulk material are delivered to the bulk material at the top end of the bulk bed, and in which the bulk beds are connected with each other by a shared horizontal charging channel, and at least one charging wagon optionally equipped with bulk material outlets that can be sealed by a bulk material valve is able to traverse the charging channel between a charging position and several partial bulk bed release positions above the bulk beds, bulk material through pipes are provided under the bulk material outlets and the bulk material valve, the bulk material outlet mouths of which end on bulk material cones of an underlying bulk bed. As a consequence, bulk material through pipes are provided under the bulk material outlets and bulk material valve of the charging wagon, whose bulk material outlet mouths end on bulk material cones of a bulk bed lying underneath. This enables a bulk material outlet distinctly under the bulk material valve, and the fluid is no longer prevented from exiting the bulk bed under the charging wagon. "Under" in terms of the invention here not only means vertically under, but also laterally offset under the bulk material outlets of the charging wagon.

The invention yields a series of significant advantages. In particular, a gas collection area with a pre-definable volume is now formed above the bulk bed, thereby enable a removal of fluid essentially free of pressure fluctuations above the bulk bed, even in operating phases where the charging wagon is moving from one to the next migrating bed reactor module, at which a partial exchange of bulk material is to be performed. Consequently, the maximum fluid treatment rate is always available with the feed and discharge window open, specifically even if the charging wagon is in driving mode. The stream of fluid is evened out as a result. Further, the bulk material is more effectively protected against damages by the bulk material valve. The highest level of bulk material protection is important especially in cases where bulk material particles of roughly uniform size are to be used. Therefore, risk of undersize grains being produced by mechanical damages to the bulk material grains is diminished.

The bulk material through pipes, or upper telescoping through pipes running within lower telescoping through pipes, are advantageously connected with each other by a shared first support element. This support element can also be designed as a dust baffle and have funnel-shaped passages, the lower ends of which adjoin to the bulk material through pipes. The bulk material through pipes or their funnel-shaped cross-sectionally enlarged inlets are welded to the dust baffle to lower the risk of bulk material accumulating on the dust baffle.

In order to adjust the fluid treatment system to potentially changing fluid treatment conditions, the length of the bulk material through pipes can be altered. As a result, the height of the bulk bed that arises can be adjusted to procedural circumstances. This solution is of intrinsic inventive importance, and can be implemented in various ways. One especially preferred embodiment provides telescoping tubular sections, which as especially preferred are connected with each other by a second support element in their respective relative positions, and lifted or lowered together via a hoisting device. Such a support element is preferably shaped like a frame, and improves the stabilization of the bulk material through pipes. Several second support elements can also be provided at various heights on the telescoping pipes. Such an arrangement makes it possible to realize bed height differences of up to about 2 m, preferably of up to about 1 m, while maintaining a constant, regular surface structure for the bulk bed. This makes it possible to easily take stock of changing treatment requirements placed on the fluid treatment system.

It is possible to both arrange the bulk material through pipe on the charging wagon and move it with the latter, and to rigidly install the bulk material through pipe as an immovable component of each bulk bed above the latter. In the last case, an intermediate space of whatever height desired that serves as an intermediate bunker for the bulk material can be provided between the bulk material valve of the charging wagon and the bulk material through pipes, which then become part of an intermediate floor.

If such a fixed intermediate floor that permits the passage of bulk material is provided under the charging wagon and separates the charging channel used by the charging wagon from the gas discharge area of the underlying bulk bed, the charging wagon can also be serviced or repaired as needed if the fluid treatment system is not shut down completely. In particular, the intermediate floor keeps the charging wagon separate from the stream of fluid passing through the fluid treatment system. Purging with a protective gas or cooling with a cooling gas can essentially be performed independently of the fluid treatment system. Such a fluid treatment system is also independent of the special features referenced above, and of intrinsic inventive importance. In an especially preferred embodiment of the invention, the intermediate floor can hence define an intermediate bunker fed by the charging wagon, which uses the intermediate floor as a bunker floor, and the charging wagon as the filling unit.

If the fluid treatment system has bulk beds that are arranged one atop the other and used for parallel operation, and charging pipes are provided to feed the lower beds lying under the uppermost bed, which connect at least one bulk material supply bunker lying above the uppermost bulk bed with the lower bed(s) and supply it with bulk material, a charging wagon is provided above the uppermost bed, and from there supplies both the uppermost and lower bed(s) with bulk material. This enables a gentle charging with bulk material without having to furnish each row of bulk beds with separate charging wagons. A fluid treatment system equipped in this way is also of intrinsic inventive importance independently of the special features described above.

In order to better protect the bulk material against breaking loads in this and other cases of multi-level fluid treatment systems as bulk material is removed or partially removed from a higher bed through down pipes that run through deeper beds, these down pipes, if necessary after combining several such drop pipes beforehand, are provided with a bulk material discharge device at their lower end region, which is activated in such a way that the drop pipe always remains filled with bulk material to a specified height level during removal or partial removal. A fluid treatment system equipped in this way is also of intrinsic inventive importance independently of the special features described above.

In the case of tiered, parallel operated bulk beds, if the charging wagon has bulk material bunker regions each having at least one outlet for the uppermost bed and at least one outlet for deeper beds, a single charging wagon can be used to supply bulk beds with bulk material at varying height levels. This scan also take place for each bulk material level, independently of other bulk material levels. To this end, the bulk material outlets of the charging wagon for the different bulk material levels can be opened and closed separately from each other, if desired.

In order to increase the useable height of bulk beds of the fluid treatment system, a straight and extended or flatly formed leveling element can be arranged in a horizontally movable manner in the upper region of the bulk bed, in particular in a bulk material supply bunker. Horizontal, in particular cyclic movements of such a leveling element distribute higher bulk material accumulations to lower bulk material surface zones. Among other things, such a leveling element can resemble a rake or grid in terms of its structural design, and can be used in fluid treatment systems with an intrinsic inventive importance not exhibited by the special features referenced above.

According to other aspects of the invention, provided is a fluid treatment system, comprising at least one parallel-operated bulk beds arranged one next to the other, in which the fluid to be treated essentially streams from the bottom up through a bulk bed, and the bulk material migrates through the bulk bed in countercurrent to the fluid essentially from the top down, in that partial quantities of bulk material are removed at the lower end of the bulk bed via bulk material discharge pipes arranged in lines or grids, and partial quantities of the bulk material are delivered to the bulk material at the top end of the bulk bed, wherein a bulk material discharge device has at least one grooved baffle element with baffle surfaces which is arranged under a row of immediately adjacent mouth openings of the bulk material discharge pipes in such a way that the baffle element backs up the bulk material exiting the bulk material discharge pipes, which has openings between the baffle surfaces provided at a distance from the pipe mouth openings for the passage of accumulated bulk material out of the baffle element, and which has at least one traversable bulk material slider adjusted to the grooved shape, and that the partial discharge of bulk material is performed by providing a drive that shifts the bulk material slider, in particular over the grooved floor, toward its direction of longitudinal extension, in such a way that the bulk material slider ejects accumulated bulk material through at least one of the openings of the baffle element which can be used to resolve the problem further underlying the invention of further improving the discharge of partial quantities of bulk material from counter-current fluid treatment systems so as not to harm the bulk material and simplify operation in large systems. These provide that a bulk material discharge device of a generic fluid treatment system has at least one grooved baffle element with baffle surfaces. The baffle element is arranged under a row of adjacent mouth openings of the bulk material partial discharge pipes in such a way that it backs up bulk material exiting through them. The baffle surfaces within the groove according to the invention are spaced apart from the mouth openings of the bulk material partial discharge pipes (mouth openings), wherein openings are provided in the groove between these spaced apart baffle surfaces, in particular in the form of floor openings, through which the backed up bulk material can exit the grooved baffle element. The bulk material is made to exit the spaced apart openings in the groove by a bulk material slider. At least one bulk material slider is accommodated by each baffle groove. To prevent bulk material particles from being able to linger for a prolonged period in the baffle groove, the bulk material slider is adjusted to the groove shape. A suitably designed edge of the bulk material slider preferably contacts all surface areas of the grooved baffle element exposed to the bulk material. Further, a drive that shifts the bulk material slider in the direction of longitudinal extension of the groove is provided for purposes of removing partial quantities of bulk material in such a way that the bulk material slider ejects accumulated bulk material from the baffle groove through at least one of the openings. Such a solution is of intrinsic inventive importance.

The newly configured baffle element, newly configured bulk material slider and its drive enable a completely new and simplified mode of operation. The only relatively short, 30 cm long, reversing working strokes of the bulk material discharge finger according to prior art are replaced by comparatively long-stroked, in particular extremely long-stroked motions. The long lengths of the discharge finger according to prior art and concurrent risks of thermal warping and the like also fall by the wayside, since the discharge sliders are constrained by function to a length of at most the inner width of the baffle groove.

The discharge device according to the invention can now be individually configured in the most varied of ways:

If the grooved baffle element is arranged in a bulk material discharge channel extending over the length of more than a migrating bed reactor module, it becomes possible to progressively move the at least one bulk material slider along this baffle groove over the width of a plurality of migrating bed reactor modules, and only reverse it once the bulk material slider has arrived at the other end of a discharge channel. In this way, a bulk material slider can sequentially remove a plurality of accumulated partial quantities of bulk materials through the floor hole of the baffle groove respectively adjacent in the direction of slider movement, since the slider hits the next baffle surface after moving beyond such a floor hole, and sweeps the bulk material lying there to the next floor hole, where it exits, and so on. Whether reference is made above or below to "floor hole" or "floor opening" or "opening", what is meant here in terms of the invention is any type of opening in the wall of the grooved baffle element, through which the bulk material shifted along the groove can exit the latter without uncontrolled quantities thereof being ejected over one of the lateral upper edges of the groove.

If several bulk material sliders arranged in tandem can be moved en masse in a grooved baffle element, several steps for discharging partial quantities of the bulk material can be initiated in a single working stroke. To this end, it makes sense to space the bulk material sliders apart in the same way as the discharge opening. In this way, the same discharge opening of two or even more bulk material sliders is traversed one after the other. And with every pass, an accumulated portion of bulk material is removed from its baffle surface via the opening. This not only makes it possible to adjust the quantity of bulk material discharged per working stroke to the requirements of the fluid treatment system by increasing or decreasing the number of bulk material sliders arranged in tandem per groove. It also enables the realization of an especially flat bulk material discharge device, in which the distance between each mouth opening of a bulk material discharge pipe and the allocated baffle surface on the grooved baffle element is very small. As a result, the respectively accumulated quantity of bulk material becomes especially small. All dimensions of the bulk material discharge device can be reduced accordingly. Even so, a sufficiently large partial quantity of bulk material can be removed from each discharge pipe per working stroke, since the removed bulk material quantity is multiplied as a function of the number of bulk material sliders arranged in tandem. In particular, it is possible to combine several bulk material sliders of a groove into one bulk material slider wagon. This type of wagon can be shifted in an especially reliable manner, and poses no risk of jamming in the grooved baffle element.

If the bulk material sliders of several parallel grooved baffle elements are mechanically grouped together, so that they can be moved en masse, the number of drives required for this purpose diminishes accordingly. As a result, all rows of bulk material discharge pipes of a migrating bed reactor module with a single row of sliders can be subjected to an exchange of a partial quantity of bulk material in a single operation. This is also possible when each grooved baffle element incorporates several bulk material sliders arranged in tandem. A bulk material slider wagon is also realized in this way.

It is possible, but not absolutely required, to configure the bulk material sliders arranged side by side in a row as a continuous element. It is instead preferred that only a few, preferably two, bulk material sliders be grouped together in grooved baffle elements running side by side, and designed as a single element. In particular, this element can be secured so that it can oscillate.

Connecting the grooved baffle elements with an intermediate floor penetrated by one of the bulk material discharge pipes as a structural component thereof avoids additional elements for reinforcing such an intermediate floor that had been required in the past, thereby saving on weight.

In principle, the cross sectional shape of the grooved baffle element is freely selectable. Standardized U-carriers of the kind used in steel construction have proven to be particularly advantageous. Such standard profiles have a particularly high uniformity in terms of their inner cross-section, and especially resistant to distortion. This counteracts a jamming of bulk material sliders or similar irregularities in an especially reliable manner. The grooved baffle elements are used to reliably guide the bulk material slider near to the wall.

If the bulk material sliders abut the grooved walls on the inside of the baffle element with little clearance, it prevents bulk material particles from getting stuck between the circumferential edge of the bulk material slider and inner surface of the grooved baffle element, and thereby being destroyed. To reduce such an abutment without the danger of jamming, for example due to thermal expansion, the actual bulk material slider is made independent of its drive in such a way that, while it is moved in the shifting direction, gravitational forces allow it to abut against the floor of the grooved baffle element of its own accord. Accordingly, a corresponding retainer has vertical guides, such as a slit or at least an oblong hole.

In order to further improve how gently the bulk material is handled, the edge of the bulk material slider touching the grooved baffle element can be made out of a material other than the remainder of the slider, e.g., be designed as a brush.

The operation of the bulk material slider is especially gentle on the bulk material when it travels at the slowest possible rate, in particular up to 2.0 m/min, preferably between 0.5 and 1.5 m/min.

In summary, the invention results in a reduction in weight, structural height, bulk material particle destruction and/or the quantity of necessary driving devices.

According to yet other aspects of the invention, provided is a method for operating a fluid treatment system, said method including the steps of providing a fluid treatment system, comprising several parallel-operated bulk beds arranged one next to the other, in which the fluid to be treated essentially streams from the bottom up through a bulk bed having a height, and the bulk material migrates through the bulk bed in counter-current to the fluid essentially from the top down, in that partial quantities of bulk material are removed at the lower end of the bulk bed, and partial quantities of the bulk material are delivered to the bulk material at the top end of the bulk bed, and in which the bulk beds are connected with each other by a shared horizontal charging channel, and at least one charging wagon optionally equipped with bulk material outlets that can be sealed by a bulk material valve is able to traverse the charging channel between a charging position and several partial bulk bed release positions above the bulk beds, and the step of varying the height of at least one of the bulk beds in order to adjust to an operating condition. The latter provides that the height of the bulk beds be increased or decreased for adjustment to specific operating conditions of the fluid treatment system. To this end, bulk material outlet pipes or bulk material discharge pipes of bulk beds in charging wagons and/or bulk material supply bunkers are raised or lowered, preferably together and uniformly.

The aforementioned and claimed components described in the exemplary embodiments to be used according to the invention are not subject to any special exceptions with regard to their size, shape, selected materials and technical concept, so that the selection criteria known in the area of application can be unrestrictedly applied.

Additional details, features and advantages of the object of the invention may be gleaned from the subclaims, as well as from the following description of the accompanying drawing and table, which present an exemplary embodiment of a fluid treatment system.

BRIEF DESCRIPTION OF FIGURES

The drawing shows:

FIG. 5 a magnified detailed view of the same charging wagon; as well as

FIG. 7A another alternative embodiment of a fluid treatment system, vertical view corresponding to FIG. 2;

FIG. 10 a schematic vertical section along the IV-IV line according to FIG. 9 of the discharge device according to FIG. 9;

DETAILED DESCRIPTION OF THE EXEMPLARY EMBODIMENTS

Figure 2:
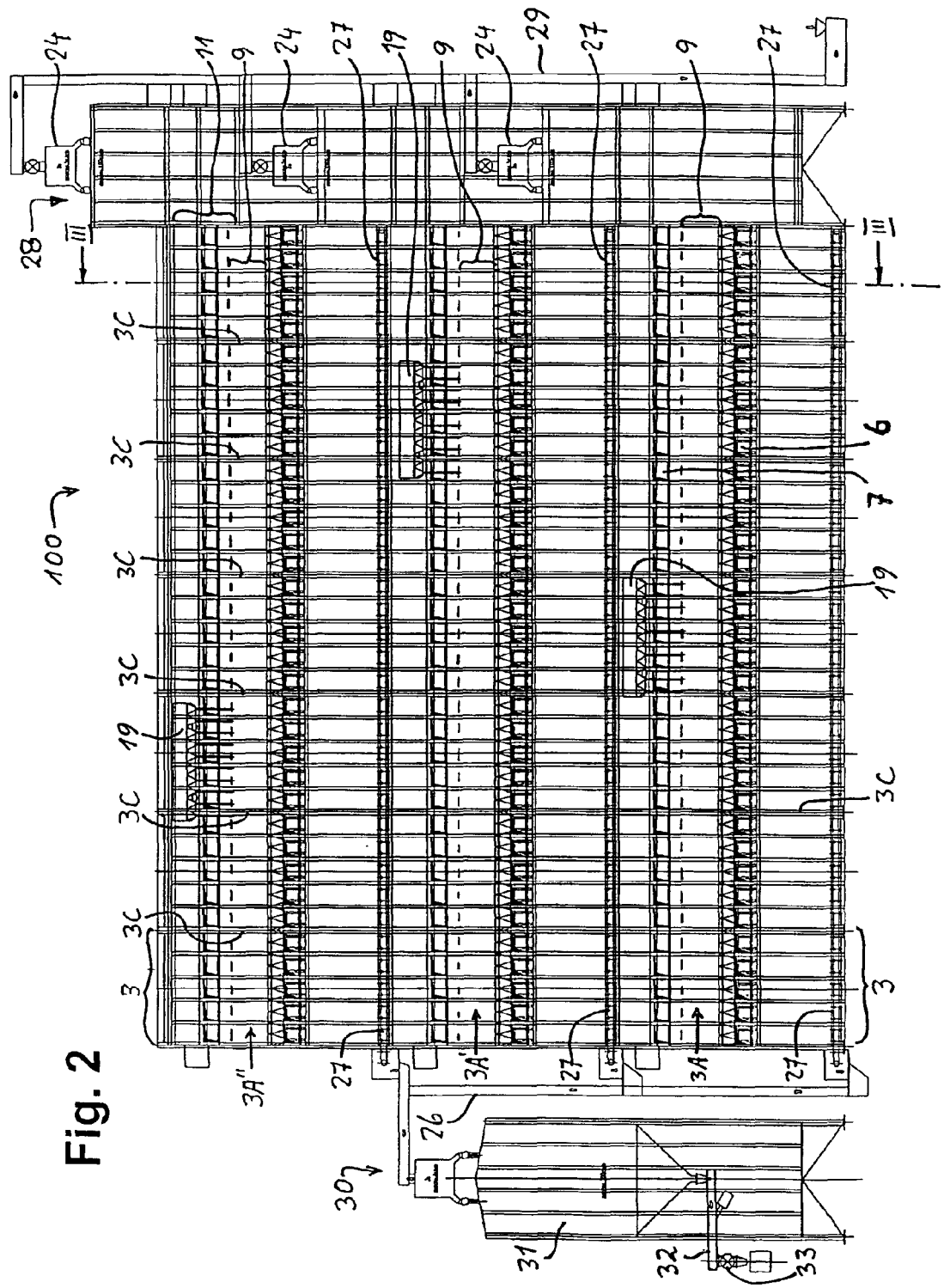
FIG. 2 a fluid treatment system, vertical section along the tubular channels (section along the II-II line according to FIG. 3)
Figure 3:
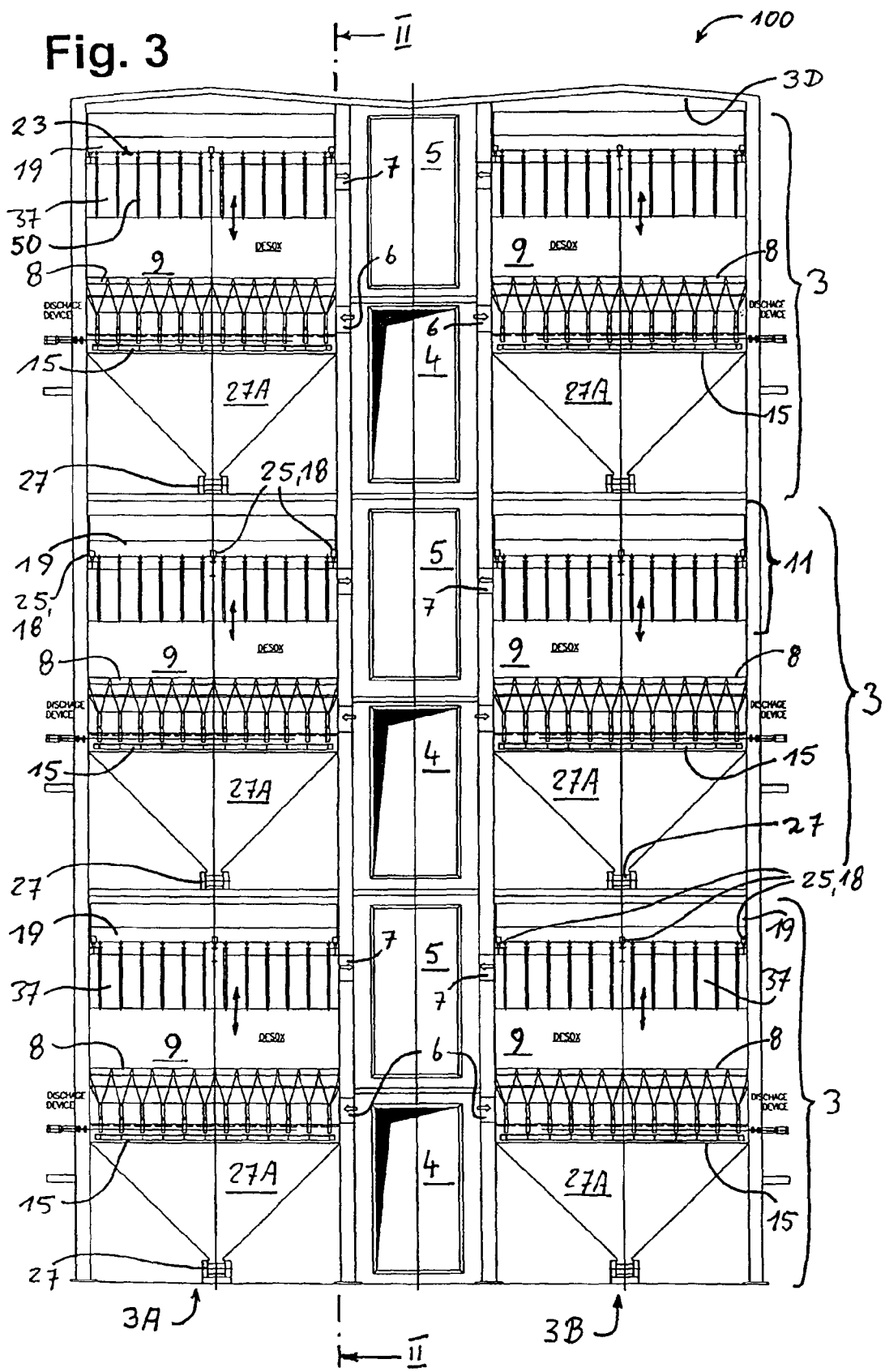
FIG. 3 a vertical section of the fluid treatment system according to FIG. 2 transverse to the direction in which the tubular channels extend (section along the III-III line according to FIG. 2)

The fluid treatment system 100 shown on FIGS. 2 and 3 is tri-level, and evident from FIG. 3 consists of two times three rows 3A, 3A', 3A" of migrating bed reactor modules 3 lying one atop the other, which are arranged in pairs parallel to each other and spaced apart only from inflow channels 4 and outflow channels 5 for treatable or treated fluid. Inflow windows 6 and outflow windows 7 join each migrating bed reactor module 3 with the allocated inflow channel 4 or outflow channel 5. In the configuration shown on FIG. 2, seven respective migrating bed reactor modules are arranged next to each other, separated from each other at a partial height by perpendicular separating walls 3C, and interrupted in the bulk material feeder (charging channel 11) and bulk material remover (conveyor belt 27) area. Therefore, the variable-height bulk beds 9 in a row 3A, 3A', 3A" of migrating bed reactor modules 3 are connected with each other in their upper region if the bulk material through pipes 50 of the bulk material feeder (described further below) do not have their maximum length.

Shown on the right of FIG. 2 is a charging tower 28 that can load the charging wagons 19 (described further below) with bulk material on each of the three levels by way of a first bulk material lift 29 and three supply silos 24 lying one atop the other. The left edge of FIG. 2 reveals a collection and outgoing transport device 30 for spent bulk material. Situated at the lower end of each row of seven migrating bed reactor modules 3 is a conveyor belt 27 below bulk material collection funnels 27A that runs along the system axis. AT the left end of the reactor module rows on the drawing, all six conveyor belts empty out into a second bulk material lift 26, which collects all bulk material in a large silo 31. The large silo can be evacuated by means of a vibrating feeder 32 that feeds a rotary valve 33, so as to feed spent bulk material to a regeneration system, for example, which is not the subject of the invention.

Figure 5:
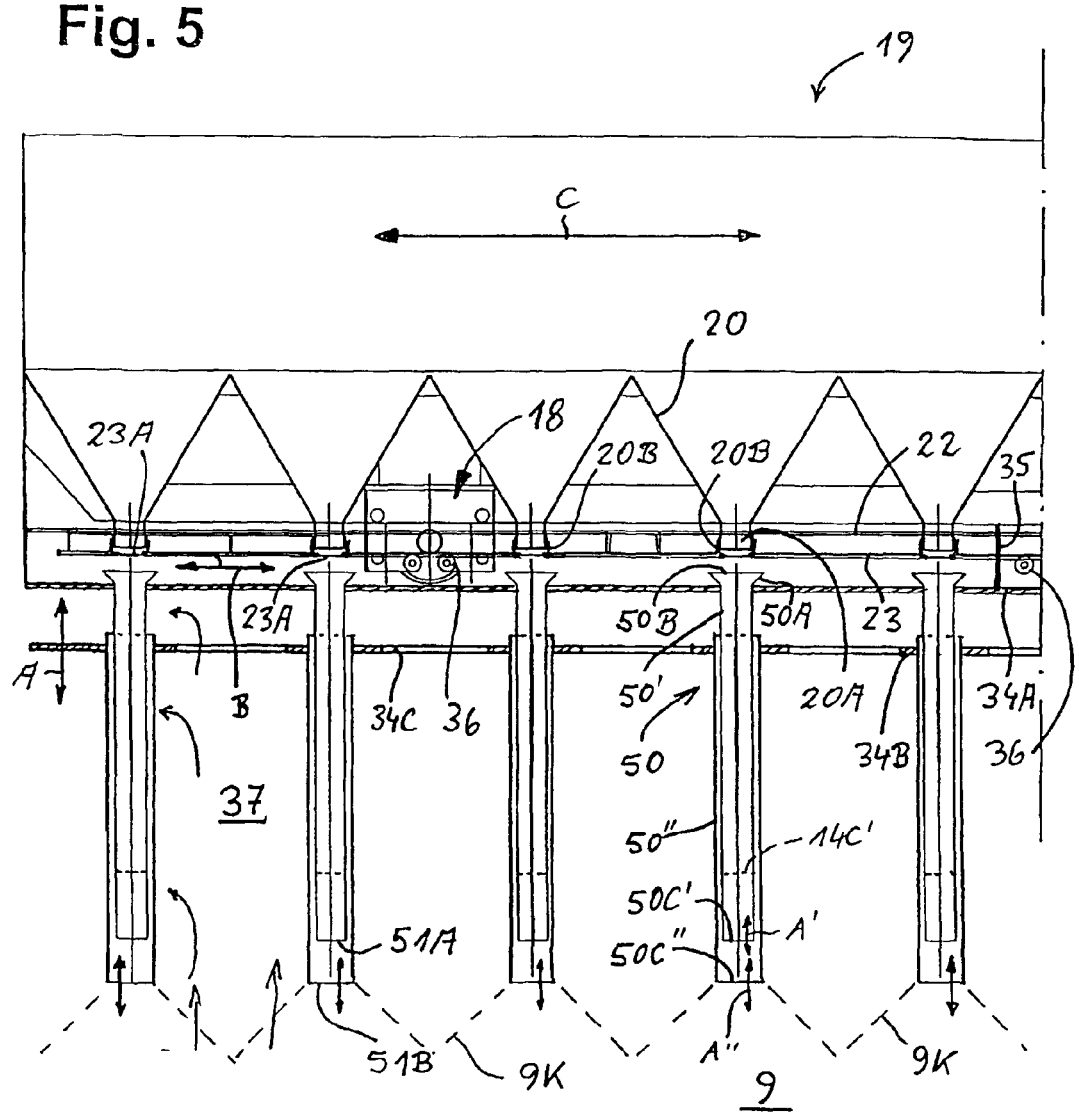

The top area of the six rows of migrating bed reactor modules each have a continuous charging channel 11, through which a charging wagon 19 with traveling mechanism 18 can be transported in a known manner using suitable guiding means from the charging position in the charging tower 28 over all migrating bed reactor modules of the same row (double arrow C on FIG. 5).

The inflow floors 8 also discernible on FIGS. 2 and 3 for the total of 42 migrating bed reactor modules preferably have the same structural design as known from EP 257653 B1. In order to easily adjust the metering quantity to the requirements when partially changing out the bulk material, and at the same time keep the system weight the same or, if possible, lower, the metering finger known from EP 257653 B1 can be replaced as the bulk material discharge device 15 by an oblong sealing element that can be made to oscillate, such as a vibrating strip or oscillating box profile. By changing the oscillation amplitude or oscillation frequency, the metering quantity can also be varied in an easy way during the partial exchange of bulk material independently of the oscillation duration.

Figure 4:
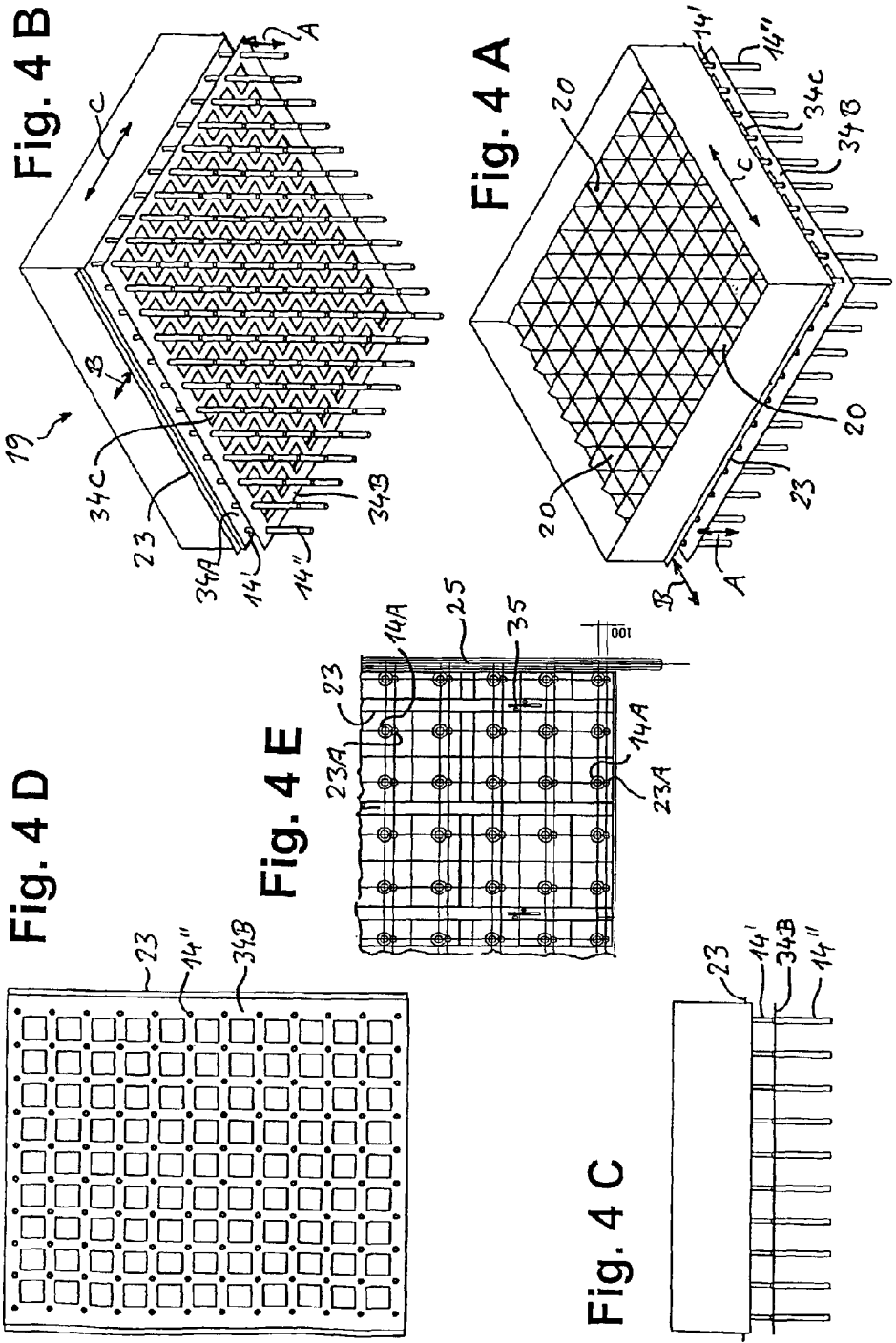
FIG. 4A a charging wagon of the fluid treatment system according to FIGS. 2 and 3, viewed in perspective at an inclination from above.
FIG. 4B the same charging wagon, viewed in perspective at an inclination from below.
FIG. 4C the same charging wagon, viewed from the side.
FIG. 4D the same charging wagon, viewed from below.
FIG. 4E the same charging wagon, magnified detailed view from above.

As evident from FIG. 4A to 5 and known from WO/2001/017663, the charging wagon can be structurally designed as a migrating receptacle box with outlet funnels 20 uniformly distributed over the entire floor surface. Situated under each outlet funnel in this exemplary embodiment is a telescoping bulk material outlet pipe 50, which begins at a slight distance under the outlet mouth 20A of the outlet funnel 20. The outlet mouths 20A all lie at the same height level, and the spacer gap to the inlet openings 14B of the bulk material through pipes 50 is sufficiently large to enable the insertion of a plate-shaped, horizontally sliding (double arrow B) bulk material valve 23 into the spacer gap. This preferably takes place in the form of a correspondingly perforated plate of the kind already known from WO 2001/01763. The entire plate must be shifted in a direction somewhat exceeding the diameter of the perforation 23A to seal or open each and every bulk material outlet. Short tubular sections 20B are slipped over the outlet mouths 20A of the outlet funnel 20 with a lateral clearance, and rest loosely on the plate of the bulk material valve 23, so that they envelop their perforations 23A and prevent bulk material from accumulating on the plate of the bulk material valve. The bulk material valve 23 is guided by support rolls rollers 36, which can be rotatably secured to supporting means 35, such as brackets, which also carry the upper bulk material through pipes 50'. A (first) support element 34A for all upper bulk material outlet pipes 50' extends under and parallel to the bulk material valve. This element can also be comprised of two vertically spaced plates with a sandwich structure (not shown). It can further form a floor plate of the charging wagon 19 and/or accommodate funnel-like expansions 50A of the bulk material outlet pipes 50', which can be joined via welding with the first support element 34A at its upper or lower funnel ends. The upper bulk material outlet pipes 50' are secured to the lower mouth ends of the funnel-like expansions, e.g., via welding. Within the meaning of the invention, the charging wagon can be operated just with these upper bulk material through pipes 50'.

If bed height adjustments are desired, the bulk material through pipes 50' can be mechanically shortened, or connected with pipe extension pieces for lengthening purposes. The process of bed height adjustment can be accelerated and simplified by having at least one second support element 34B telescopically (in the corresponding increment as the upper bulk material outlet pipes 50') keep the lower bulk material through pipes 50" spaced apart and at the same height, and guide them from below via the mouth ends of the upper bulk material through pipes 50'. In principle, bed height adjustment can also take place during the operation of the fluid treatment system by lifting or lowering the entire second support element 34B in relation to the charging wagon 19 (double arrow A).

The lower telescoping pipes can be combined into a simply configured and lightweight array by using a large-surface grid arrangement as the second support element, in particular in the form of a metal plate perforated over a large surface between the telescoping pipes (as depicted), so that the outflow paths of the treated fluids are not markedly impeded within the gas discharge area 37. The gas discharge area is defined by the self-contained first support element 34A and the height of the bulk material through pipes 50.

Figure 6:
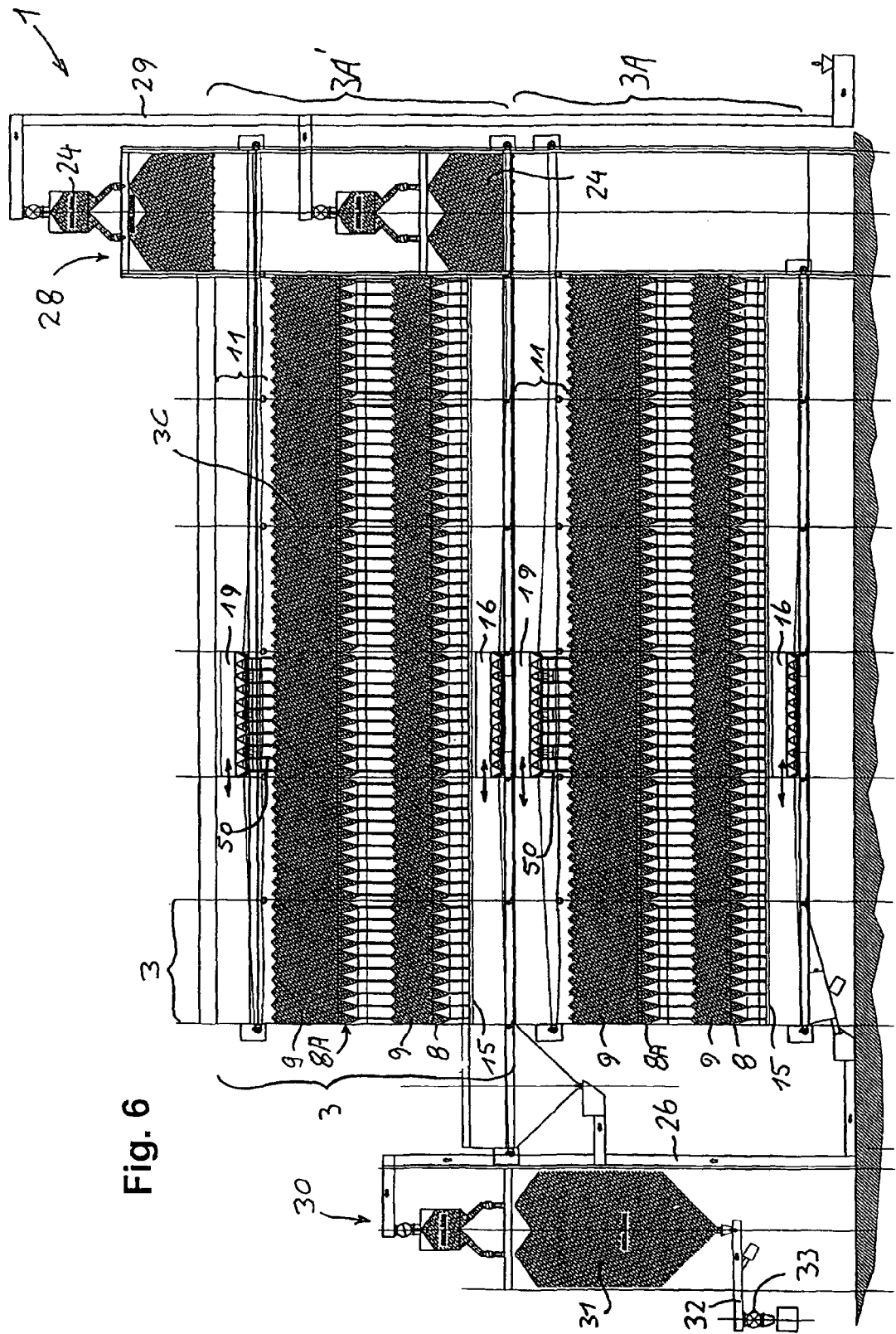
FIG. 6 an alternative embodiment of a fluid treatment system, vertical view.

While the exemplary embodiment according to FIGS. 2 and 3 depicts a tri-level fluid treatment system for one-stage bulk beds, in which the same process takes place in each of the migrating bed reactor modules, e.g., the removal of $SO_2$ from smoke (DESOX), the exemplary embodiment according to FIG. 6 shows a bi-level fluid treatment system in which seven migrating bed reactor modules are also arranged in a row on each level, and two parallel rows are spaced apart from each other by an inflow channel 4 and outflow channel 5 lying in between them for fluid that is to be treated or fluid that has been treated. The same process runs its course on each of the two levels. However, this exemplary embodiment provides a two-stage fluid treatment process as described for example in WO/ . . . for the removal of NOx with upstream scrubbing of SOx from smoke. Therefore, each migrating bed reactor module is bi-level, in that it exhibits a second inflow channel 8A. In the exemplary embodiment depicted on FIG. 6, not only is a charging wagon provided for the bulk material feeder, but also a bulk material discharge wagon 16, which can correspond to the charging wagon 19 in terms of its design, wherein both wagon types can be designed as shown on FIG. 4A to 5.

Figure 1:
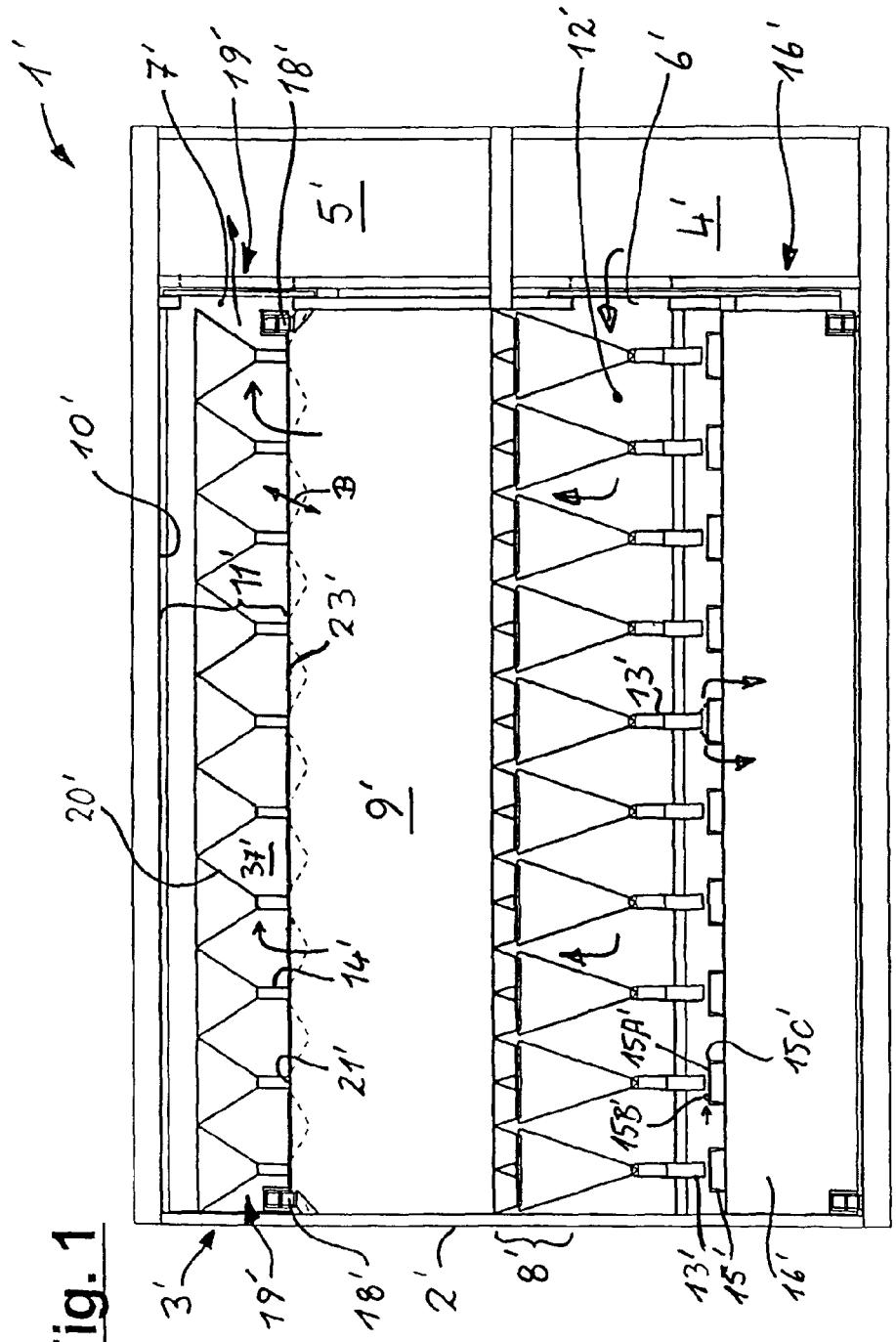
FIG. 1 a prior art fluid treatment system.
Figure 7B:
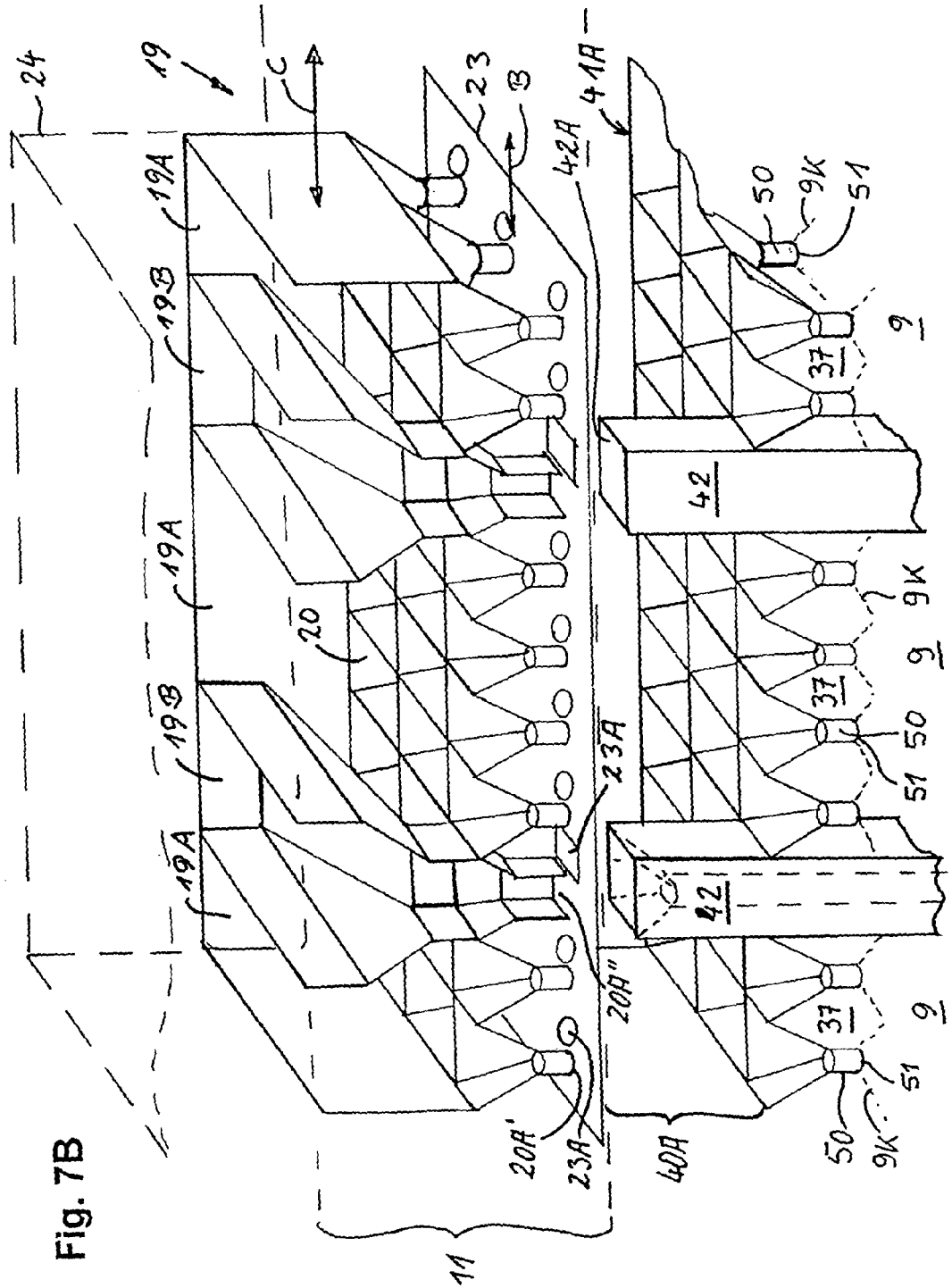
FIG. 7B a detailed view of the charging channel in the same fluid treatment system, with the charging wagon in the fill setting.

The exemplary embodiment according to FIG. 7A/7B shows an embodiment of the invention in which a bulk material supply bunker 40A, 40B is situated as the intermediate bunker above each bulk bed 9D, 9E on top of the bulk beds 9C, 9E lying one atop the other, differing from the exemplary embodiment according to FIGS. 2 and 3. Situated under each of the bulk material supply bunkers is an intermediate floor 41A, 41B, which serves as a bulk material distribution floor, through which the bulk material can exit the overlying supply bunker and pass into the underlying bulk bed. The intermediate floor constitutes the cover of the gas discharge area 37 of the accompanying bulk bed, as opposed to FIGS. 1 and 3, which do not necessarily depict an intermediate floor. As a consequence, the fluid treated in the bulk bed practically does not come into contact with the bulk material of the overlying bulk material bunker, since the supply bunker can be virtually sealed tight, so that the treated fluid does not pass through it. In this case, the sole charging channel is located above the upper intermediate floor and below the cover 3D in a space kept essentially gastight.

As opposed to the exemplary embodiment according to FIGS. 2 and 3, the charging wagon 19 is divided into bunker regions 19A, 19B, of which one is used to fill the uppermost bulk bed 9D, 9E, and the other is used to fill the bulk bed lying underneath. Located below the outlet mouths 20A', 20A" of the bunker regions 19A, 19B is a bulk material valve 23 having the design generally depicted on FIG. 5 and described in conjunction with the latter. The same also applies with respect to the traveling mechanism 18. Situated under the outlet mouths 20A' of the bunker region 19A are the bulk material conical tips of the bulk material intermediately stored in the underlying bulk material supply bunker 40A. Therefore, the bulk material supply bunker 40A (intermediate bunker) performs a function similar to a bulk material sluice, but lacks the lower bulk material valves, since when at rest, the bulk material cones 9K of the bulk bed 9 prevent the bulk material from downwardly escaping from the bulk material supply bunker 40A.

The bulk material outlet mouths 20A" of the [first] or second bunker region 19B of the charging wagon 19 are positioned above the upper mouth openings 42A of charging pipes 42 that expand upwardly, if necessary conically, and protrude upwardly over the intermediate floor 41A if the charging wagon is situated in its charging position above a bulk bed. In this way, the intermediate bunker 40A stays reserved for the upper bulk bed 9D, and the lower bulk bed 9E can also be supplied with new bulk material by means of the single charging wagon during the partial replacement of bulk material. This takes place automatically and in a quantity in which the bulk material is removed via the bulk material discharge device (conveyor belt 27) or bulk material discharge device 15, for example of the kind known from EP 0357653 B1 of the applicant and described by example in conjunction with FIG. 1. Located at the lower end of the charging pipe 42 is a known intermediate bunker 40B, which has a similar function to that of the upper intermediate bunker 40A.

In this exemplary embodiment as well, the bulk material valve 23 of the charging wagon used is a perforated and shifting plate, for example of the kind basically already described in conjunction with FIG. 5. The movement of the plate for opening and closing the outlet mouths 20A', 20A" is the same as described in connection with FIG. 5. If the plate is in the open setting, bulk material exits the bunker region 19A or 19B, running downward and out of the charging wagon and into the accompanying intermediate bunker 40A, 40B if the bulk material is removed at the lower end of the corresponding bulk bed 9D, 9E. With the bulk material valve 23 closed, the charging wagon is moved from one position to the next.

As opposed to the exemplary embodiment according to FIG. 2, a charging tower 28 need not be provided to the side of the migrating bed reactor module 3. Rather, the charging wagon 19 can be filled via a gastight supply silo 24 on the roof of the migrating bed reactor system. The overflow openings between this supply silo 24 and the charging wagon 19 through the cover of the migrating bed reactor system are provided via gastight sealable means, in particular resembling a sluice.

The features from the figures can be combined as desired within the framework of the invention.

The paired rows of migrating bed reactor modules on several levels yields a highly compact system design, which is very readily adaptable to given space conditions, and especially favorable from a thermal and flow standpoint. The entire fluid treatment surface can be extremely large given a comparatively lightweight system, and is also suitable, for example, for gas scrubbing purposes involving extremely large hourly gas quantities, e.g., 1 million standard cubic meters or more.

Figure 8:
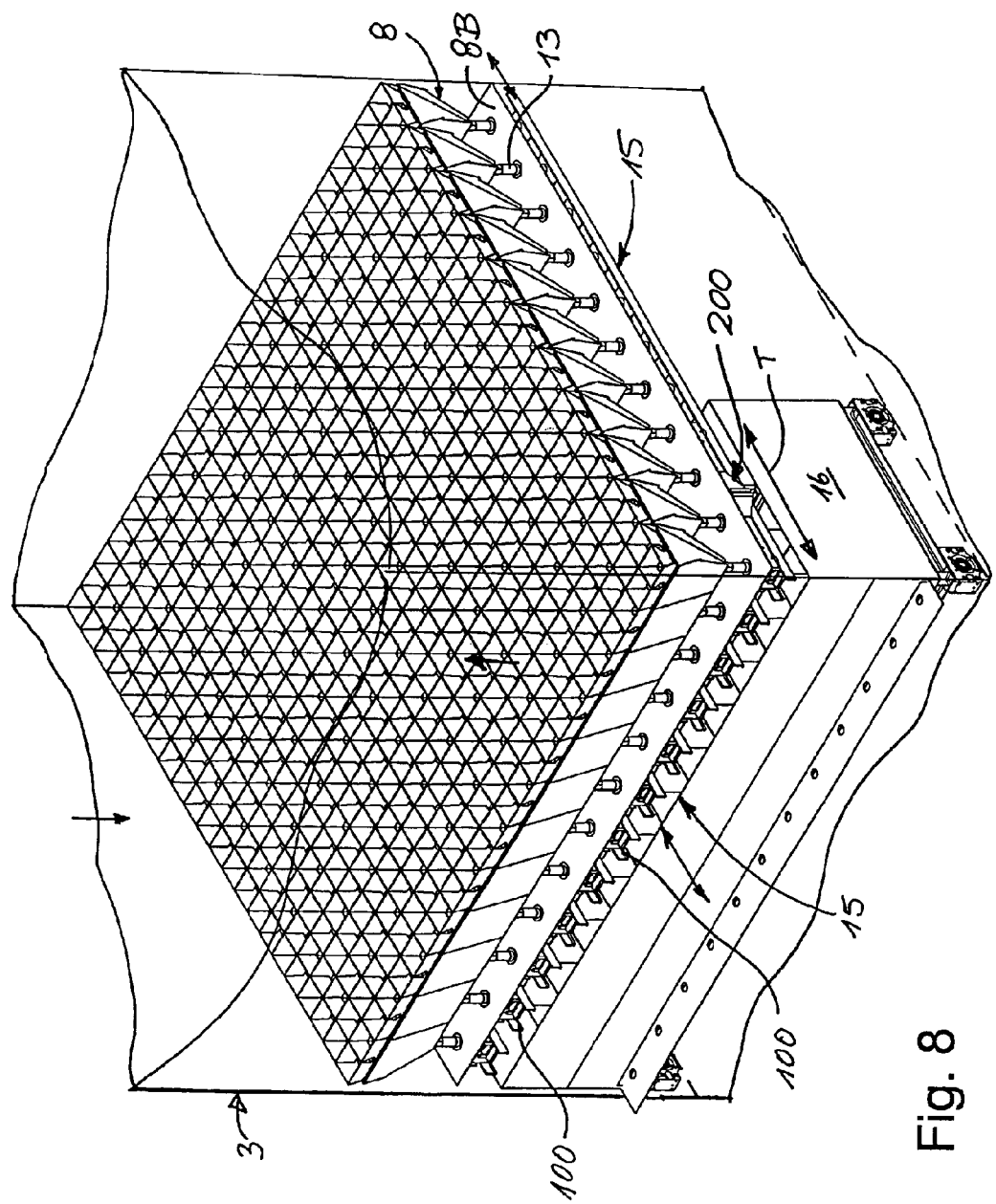
FIG. 8 a perspective view of a section of a single migrating bed reactor module of a fluid treatment system showing its inflow floor with discharge device, FIG. 9 a first embodiment of a bulk good discharge device in the same fluid treatment system, with the inflow floor and outgoing bulk material trans-port wagon omitted.

In the exemplary embodiment according to FIG. 8, each of preferably several migrating bed reactor modules 3 sequentially arranged in tandem is provided with an inflow and bulk material removal floor 8, e.g., of the kind known from EP 0 257 653 B1, among other places. The bulk material discharge pipes 13 that abut bulk material outlet grooves from below are of telescoping design, and sit up like a grid with a round anchor plate on an intermediate floor 8B. They can pass through the perforations 8C of the intermediate floor 8B and end at a fixed distance beneath it (FIG. 14). The intermediate floor 8 is carried by a substructure designed as a bulk material discharge device 15. A bulk material discharge wagon 16 can be concurrently moved under the bulk material discharge device 15 while traveling through a bulk material outlet channel that connects several migrating bed reactor modules in series in the lower region to the bulk material retainer.

Figure 9:
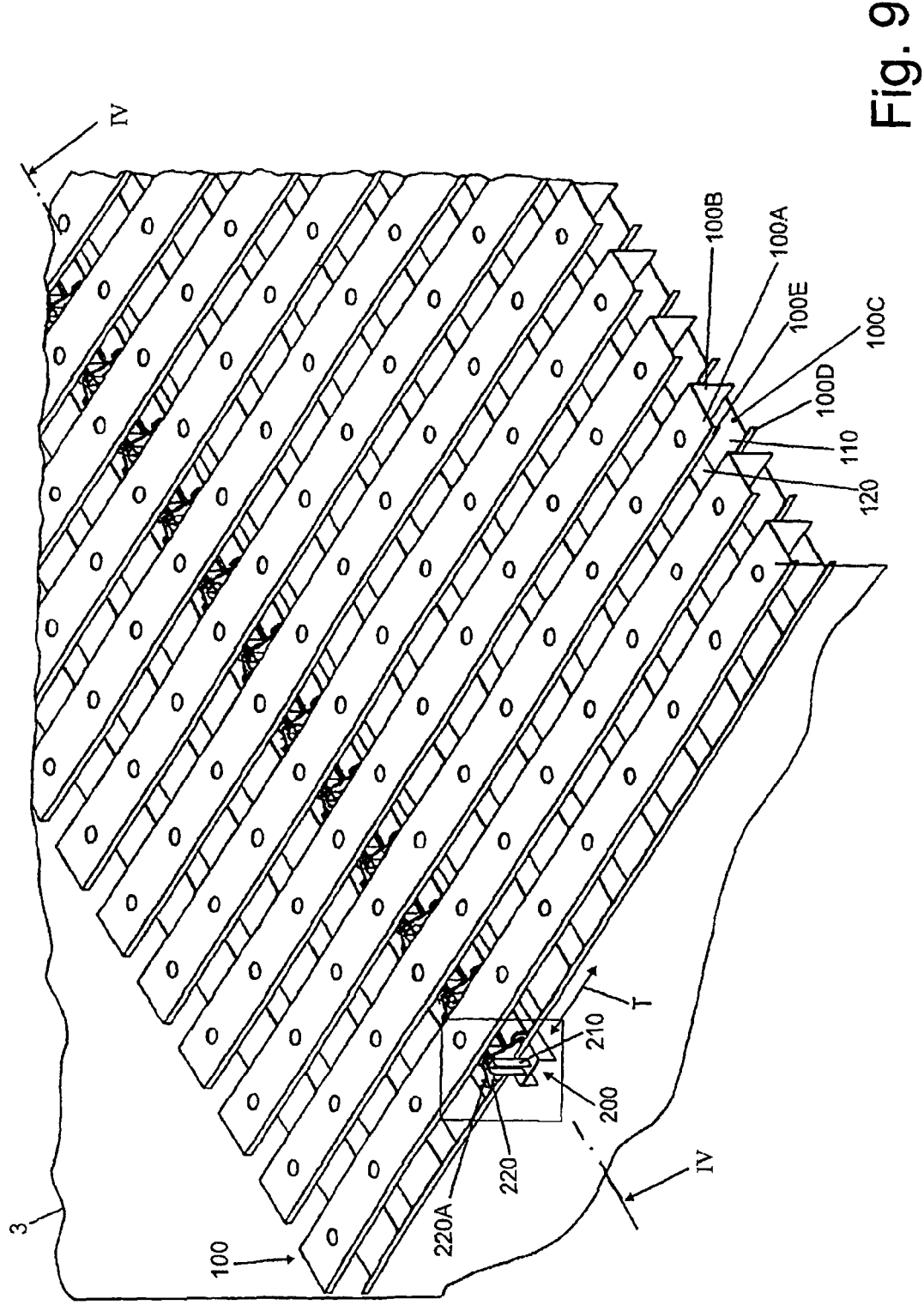

The bulk material discharge device 15 depicted in greater detail on FIGS. 9 and 10 can consist of profiles 10 with a C-shaped or similar profile cross section that extend over the reactor width. The upper side of the profile is perforated at grid-like intervals in such a way that the mouths of the bulk material discharge pipes 13 have roughly the same cross section of fit through there. This upper profile leg 100A serves as a support for the intermediate floor 8B. A preferably closed, lateral, essentially vertical profile leg 100B adjoins a lateral longitudinal edge of the upper profile leg 100A. Its lower edge in term adjoins a horizontal lower profile leg 100C. The latter consists of bulk material baffle surfaces 110 provided at regular intervals, and openings (floor openings) 120 arranged between them. The baffle surfaces 110 are essentially located centrally underneath the respectively allocated bulk material discharge pipe 13 of the overlying bulk material discharge floor 8. At the lower profile leg 100C, the edge lying opposite the lateral profile leg 100B is adjoined by a lateral wall 100D with a roughly vertical alignment, which is flush with a lateral wall 100E that adjoins the edge of the upper profile leg 100A lying opposite the lateral profile leg 100B, also in a vertical alignment. This gives rise to a box profile with roughly a C-shaped cross section, in which the opposing guide rails for a bulk material slider wagon 20 form between the free edges of the flush upper and lower lateral wall 100D and 100E. The lateral profile leg 100B, the lower profile leg 100C, and the lower lateral wall 100D form a grooved baffle element with discharge openings 120 lying between the baffle surfaces 110. In the exemplary embodiment depicted here, a plurality of rows of bulk material discharge pipes 13 are arranged parallel one next to the other. A correspondingly high number of profiles 100 are provided at the appropriate intervals.

The bulk material slider wagon 200 shown on FIG. 10 extends at a right angle to the profiles 100. A traverse 210 has upright arms 210A that pass through between the lateral intervals of adjacent profiles 100, and each carry a traveling mechanism 220 with rolling or sliding guide elements 220A designed as rail wheels in the depicted and in that sense preferred exemplary embodiment, which run on rails between the upper edge of the lower lateral wall 100D and the lower edge of the upper lateral wall 100E, thereby providing a guide. The traveling mechanism 220 is adjacent to a bulk material slider 230, which grazes the cross section of the grooved baffle element as it traverses over the length of the profile 100 when the bulk material slider wagon 200 is moved in the direction of longitudinal extension T of the profiles 100 by a shared drive. Therefore, the single bulk material slider per groove alternately passes over baffle surfaces 110 and discharge openings 120. The preferably uniform and comparatively slow traveling rate of the bulk material slider wagon 200 of up to 2.0 m/min or less affords extremely good protection to the bulk material.

Figure 11:
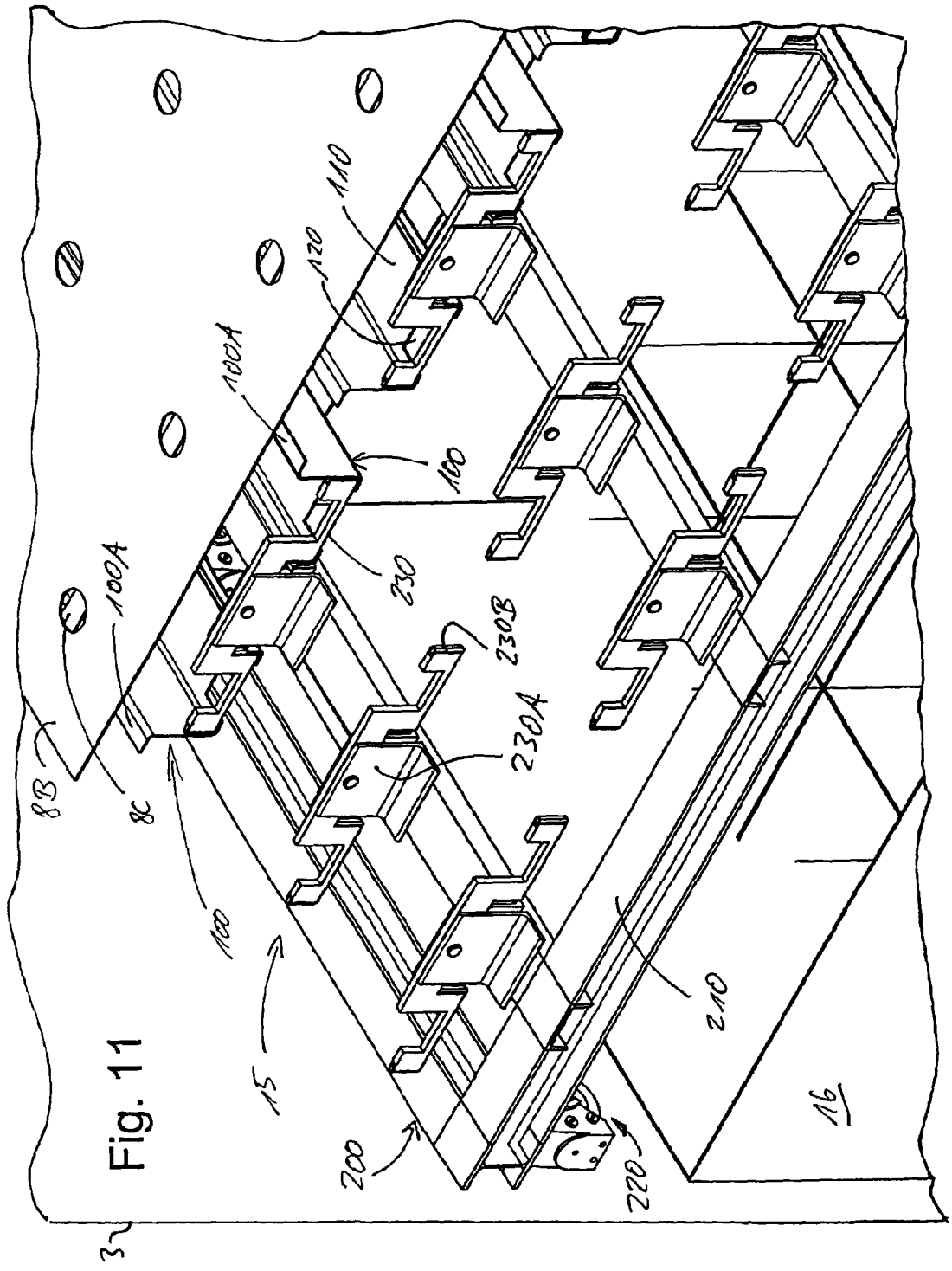
FIG. 11 a perspective view of an alternative embodiment for the bulk material outlet device according to FIGS. 8 and 9, 10.
Figure 12:
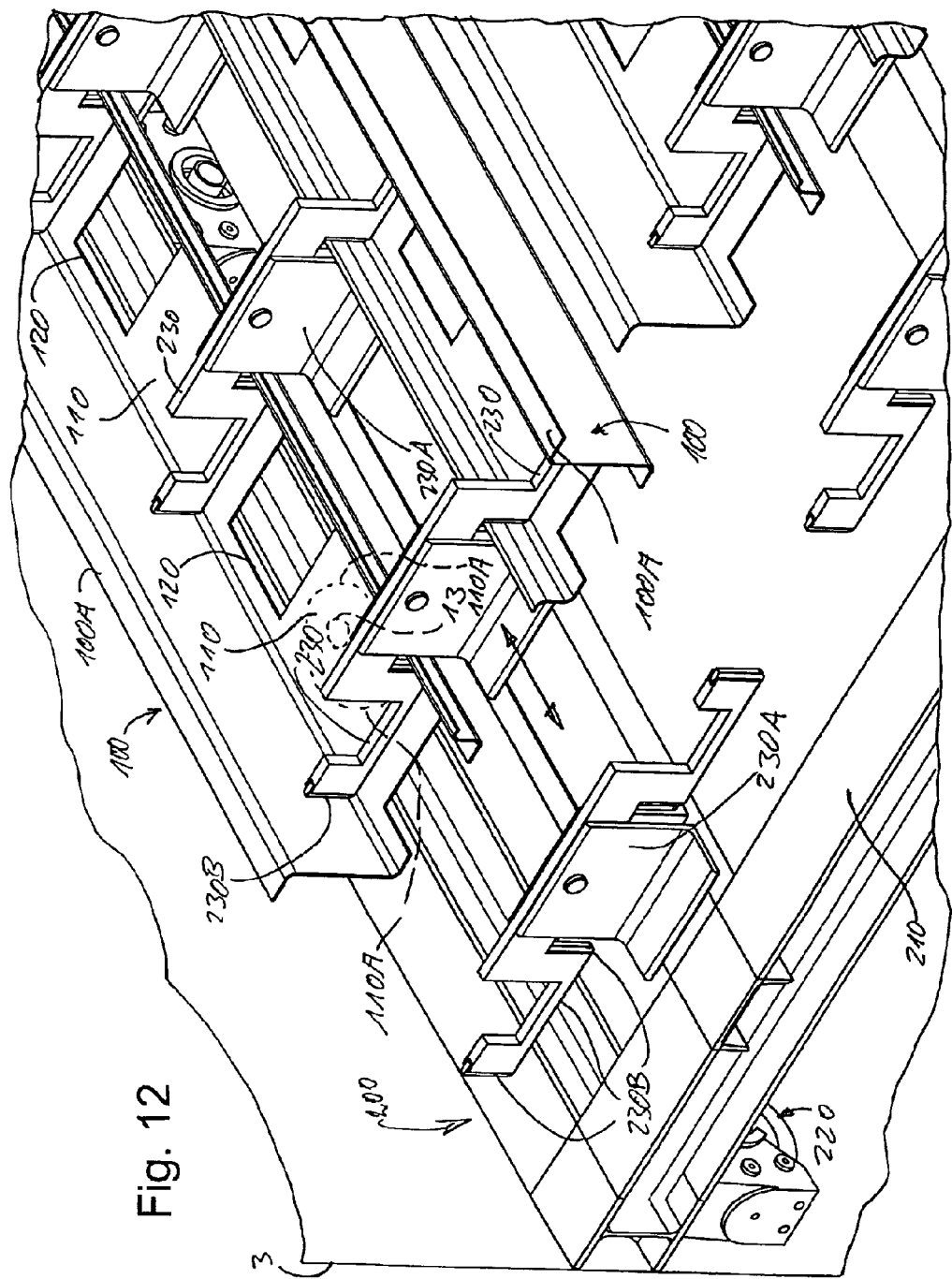
FIG. 12 a magnified detailed view of the bulk material discharge device according to FIG. 11, with the intermediate floor omitted.

The exemplary embodiment according to FIGS. 11 and 12 differs from the above first in that the profiles 100 that form the grooved baffle surfaces are paired and spaced laterally apart from each other, and essentially have a slightly asymmetrical U-shape. The upper edge of the respective outlying, somewhat longer U-leg is provided with an upper profile leg 100A for accommodating, carrying, and possibly securing an intermediate floor 8B. The bulk material sliders 230 are connected in pairs, and suspended so as to slightly oscillate by a holder 230A in the area of the intermediate space of each profile pair, so it can remain able to smoothly traverse through the bulk material groove formed by the profile, even given minor warping of the profiles 100. One other special feature of this exemplary embodiment is that several—four in the exemplary embodiment—bulk material slider pairs 230 are arranged in tandem at a distance from adjacent bulk material discharge pipes 13, so that, as the bulk material sliders pass through the grooved baffle elements 100 a single time, bulk material is swept up and removed four times in succession from each baffle surface. In the exemplary embodiment shown, the bulk material sliders 230 of all adjacent grooved baffle elements 100 are again connected to each other to form a bulk material slider wagon 200.

As further discernible from this exemplary embodiment, the edges of the valve 230 grazing the grooved walls of the baffle elements 100 are set up in a special way, specifically to resemble a brush in the exemplary embodiment (edge strip 230B). Also evident from FIG. 11 is a bulk material discharge wagon 16, which can be drive-connected with the bulk material slider wagon 200, so that both wagons run through the discharge channel together with a single drive.

As also evident as an example from FIG. 12 is how a bulk material cone 110A forms between the mouth of a bulk material discharge pipe and a baffle surface 110.

Figure 13:
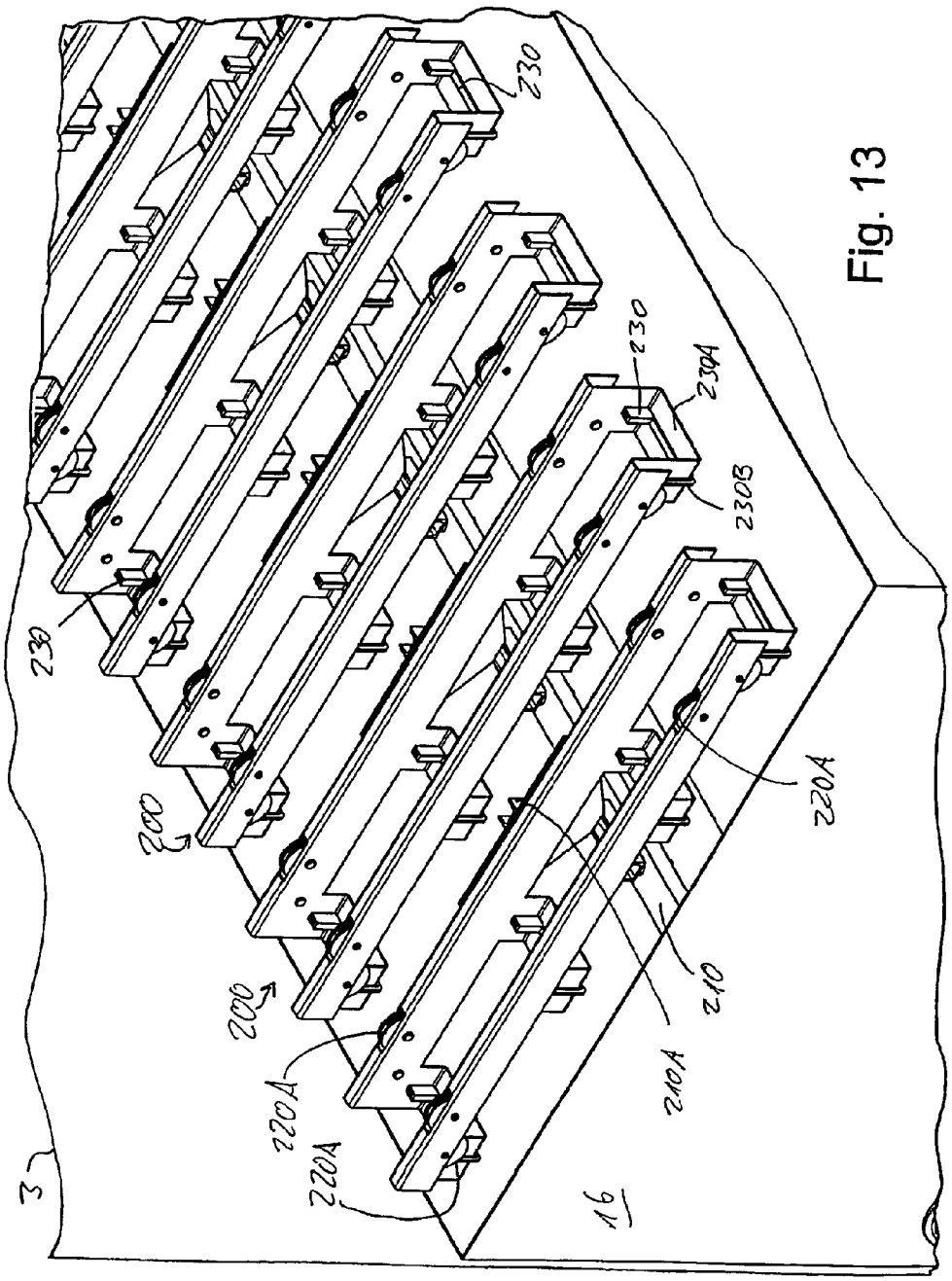
FIG. 13 a perspective view of another alternative embodiment of the bulk material outlet device for a fluid treatment system according to FIG. 8, with the grooved baffle elements omitted, and FIG. 14 an overall view of a bulk material slider wagon with a grooved baffle element for the bulk material discharge device according to FIG. 13.

The exemplary embodiment according to FIGS. 13 and 14 differs from the two preceding ones in that each grooved baffle element 110 comprised of two U-profiles that open toward each other is provided with a bulk material slider wagon 200 expressly guided above and below, which in the depicted and in that sense preferred exemplary embodiment has four bulk material sliders 230 arranged in tandem at an interval from the bulk material discharge pipes 13, the holders 230A of which guide the bulk material sliders 230 in slotted retainers, so that their gravitational force causes them to rest gently on the groove floor. If the edge strips 230B of the bulk material sliders 230 are in turn comprised of a different material, e.g., designed as brushes, the bulk material sliders 230 can also be arranged rigidly on the front or rear side of the holder 230A (not shown), and thereby ensure an even more optimally gentle handling of the bulk material as the wagon 200 travels forward and backwards. The adjacent bulk material slider wagons 200 are propelled by a shared drive, wherein a traverse 210 is again connected with vertical arms 210A, which laterally and centrally engage the respective bulk material slider wagon 200. The bulk material slider wagons 200 configured in this way can be mounted with a certain clearance relative to each other, so that the valves can move without catching, even given deformations of the grooved baffle elements 100. The bulk material discharge pipes are omitted from a grooved baffle element 100 on the right side of FIG. 14, while an intermediate floor is also not shown on the left side of the figure. Such a profile leg 1008 is partially realized in the form of connecting elements 100F. The retaining function rests solely with the lower U-profile steel.

Instead of accommodating a bulk material discharge wagon 16, the bulk material discharge channel that connects several migrating bed reactor modules 3 of a series can be funneled in design, and equipped with a longitudinal conveying means, such as a transport band, a vibrating feeder or the like for transporting away bulk material toward a front side of the system.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds,
wherein bulk material through pipes are provided under the bulk material outlets and the bulk material valve of the charging wagon, bulk material outlet mouths of which end on bulk material cones of an underlying bulk bed, wherein the bulk material through pipes are connected by a first support element that joins them together and is perforated by them in the area of their inlet openings.

2. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds,
wherein bulk material through pipes are provided under the bulk material outlets and the bulk material valve of the charging wagon, bulk material outlet mouths of which end on bulk material cones of an underlying bulk bed, wherein the bulk material valve includes perforations and is held by a support means provided with rollers, so that the perforated bulk material valve can be horizontally shifted to open and close the bulk material discharge pipes.

3. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds,
wherein bulk material through pipes are provided under the bulk material outlets and the bulk material valve of the charging wagon, bulk material outlet mouths of which end on bulk material cones of an underlying bulk bed, wherein the bulk material through pipes have a variable length.

4. The fluid treatment system of claim 3, wherein short tubular sections are slipped over outlet mouths of outlet funnels of the charging wagon with a lateral clearance, and rest loosely on the bulk material valve, so that the tubular sections envelop perforations in the bulk material valve.

5. The fluid treatment system of claim 3, wherein the bulk material through pipes are designed as a telescoping arrangement, including an upper and lower bulk material through pipe so that the bulk material outlet mouths of the bulk material through pipes can be shifted up or down with a change in the height of the bulk bed.

6. The fluid treatment system of claim 5, wherein the lower bulk material through pipes are connected with each other at least at one location by a shared, grid-like second support element.

7. The fluid treatment system of claim 6, wherein the second support element is a plate perforated over a large surface between the lower bulk material through pipes.

8. The fluid treatment system of claim 3, wherein the bulk material through pipes are a component part of at least one of the charging wagon and each bulk bed.

9. The fluid treatment system of claim 3, wherein several bulk beds are arranged one over the other, and further including charging pipes for loading lower bulk beds, which pass through the overlying bulk beds, wherein the charging wagon is provided above an uppermost bulk bed.

10. The fluid treatment system of claim 3, wherein a linear or flat leveling element is arranged in a horizontally movable manner in the area of a desired height of a bulk material layer.

11. The fluid treatment system of claim 3, further including two parallel, laterally spaced rows of migrating bed reactor modules, in which each migrating bed reactor module encompasses at least one bulk bed, wherein the migrating bed reactor modules are connected with each other by a charging channel that continuously runs above the bulk beds of each series.

12. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds,
wherein bulk material through pipes are provided under the bulk material outlets and the bulk material valve of the charging wagon, bulk material outlet mouths of which end on bulk material cones of an underlying bulk bed, wherein the bulk material through pipes has a length and the length is adjustable.

13. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds, wherein bulk material through pipes are provided under the bulk material outlets and the bulk material valve of the charging wagon, bulk material outlet mouths of which end on bulk material cones of an underlying bulk bed, several bulk beds are arranged one over the other, and further including charging pipes for loading lower bulk beds, which pass through the overlying bulk beds, wherein the charging wagon is provided above an uppermost bulk bed, wherein the charging wagon has bulk material bunker regions each with at least one outlet mouth for the uppermost bulk bed and those with at least one outlet mouth for the lower bed.

14. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds, wherein bulk material through pipes are provided under the bulk material outlets and the bulk material valve of the charging wagon, bulk material outlet mouths of which end on bulk material cones of an underlying bulk bed, wherein an intermediate floor that permits bulk material to pass through is provided under the charging wagon, separating the charging channel from a gas discharge room of the underlying bulk bed.

15. The fluid treatment system of claim 14, wherein the intermediate floor defines an intermediate bunker fed by the charging wagon.

16. A fluid treatment system, comprising of several parallel-operated bulk beds arranged one next to the other, in which the fluid to be treated streams from the bottom up through a bulk bed, and bulk material migrates through the bulk bed in countercurrent to the fluid from the top down, in that partial quantities of bulk material are removed at a lower end of the bulk bed, and partial quantities of the bulk material are delivered to the bulk material at a top end of the bulk bed, and in which the bulk beds are connected with each other by a shared horizontal charging channel, and at least one charging wagon equipped with bulk material outlets that can be sealed by a bulk material valve is able to traverse the charging channel between a charging position and several partial bulk bed release positions above the bulk beds, wherein bulk material through pipes are provided under the bulk material outlets and the bulk material valve of the charging wagon, bulk material outlet mouths of which end on bulk material cones of an underlying bulk bed, the system further including a bulk material discharge device having at least one grooved baffle element with baffle surfaces which is arranged under a row of immediately adjacent mouth openings of bulk material discharge pipes in such a way that the baffle element backs up the bulk material exiting the bulk material discharge pipes, which has openings between the baffle surfaces provided at a distance from the pipe mouth openings for the passage of accumulated bulk material out of the baffle element, and which has at least one traversable bulk material slider adjusted to the grooved shape, and that the partial discharge of bulk material is performed by providing a drive that shifts the bulk material slider toward its direction of longitudinal extension, in such a way that the bulk material slider ejects accumulated bulk material through at least one of the openings of the baffle element.

17. The fluid treatment system of claim 16, wherein several bulk material sliders of a grooved baffle element are grouped together to form a bulk material slider wagon.

18. A fluid treatment system, comprising several parallel-operated bulk beds in which the fluid to be treated essentially streams from the bottom up through a bulk bed, and the bulk material migrates through the bulk bed in countercurrent to the fluid essentially from the top down, in that partial quantities of bulk material are removed at the lower end of the bulk bed, and partial quantities of the bulk material are delivered to the bulk material at the top end of the bulk bed, and in which the bulk beds are connected with each other by a shared horizontal charging channel, and at least one charging wagon optionally equipped with bulk material outlets that can be sealed by a bulk material valve is able to traverse the charging channel between a charging position and several partial bulk bed release positions above the bulk beds, the several bulk beds including beds arranged one over the other having overlying bulk beds and lower bulk beds, and the system further including charging pipes for loading the lower bulk beds, which pass through the overlying bulk beds, wherein the charging wagon has bulk material bunker regions each with at least one outlet mouth for the uppermost bulk bed and those with at least one outlet mouth for the lower bed(s).

19. A fluid treatment system, comprising several parallel-operated bulk beds in which the fluid to be treated essentially streams from the bottom up through a bulk bed, and the bulk material migrates through the bulk bed in countercurrent to the fluid essentially from the top down, in that partial quantities of bulk material are removed at the lower end of the bulk bed, and partial quantities of the bulk material are delivered to the bulk material at the top end of the bulk bed, and in which the bulk beds are connected with each other by a shared horizontal charging channel, and at least one charging wagon optionally equipped with bulk material outlets that can be sealed by a bulk material valve is able to traverse the charging channel between a charging position and several partial bulk bed release positions above the bulk beds, wherein an intermediate floor that permits bulk material to pass through is provided under the charging wagon, separating the charging channel from a gas discharge room of the underlying bulk bed.

20. The fluid treatment system of claim 19, wherein the intermediate floor defines an intermediate bunker fed by the charging wagon.

21. A fluid treatment system, comprising at least one parallel-operated bulk beds arranged one next to the other, in which the fluid to be treated essentially streams from the bottom up through a bulk bed, and the bulk material migrates through the bulk bed in countercurrent to the fluid essentially from the top down, in that partial quantities of bulk material are removed at the lower end of the bulk bed via bulk material discharge pipes arranged in lines or grids, and partial quantities of the bulk material are delivered to the bulk material at the top end of the bulk bed, wherein a bulk material discharge device has at least one grooved baffle element with baffle surfaces which is arranged under a row of immediately adjacent mouth openings of the bulk material discharge pipes in such a way that the baffle element backs up the bulk material exiting the bulk material discharge pipes, which has openings between the baffle surfaces provided at a distance from the pipe mouth openings for the passage of accumulated bulk material out of the baffle element, and which has at least one traversable bulk material slider adjusted to the grooved shape, and that the partial discharge of bulk material is performed by providing a drive that shifts the bulk material slider, in particular over the grooved floor, toward its direction of longitudinal extension, in such a way that the bulk material slider ejects accumulated bulk material through at least one of the openings of the baffle element.

22. The fluid treatment system of claim 21, wherein the grooved baffle element is arranged in a bulk material discharge channel extending over the length of more than one migrating bed reactor module.

23. The fluid treatment system of claim 21, wherein several bulk material sliders are arranged in tandem in the grooved baffle element.

24. The fluid treatment system of claim 21, wherein several bulk material sliders of a groove are grouped together to form a bulk material slider wagon.

25. The fluid treatment system of claim 23, wherein the bulk material sliders of several parallel grooved baffle elements are mechanically grouped together.

26. The fluid treatment system of claim 21, wherein more than one bulk material slider is grouped together into grooved baffle elements that run side-by-side.

27. The fluid treatment system of claim 21, wherein the at least one grooved baffle element, as a structural component of an intermediate floor penetrated by or carrying the bulk material discharge pipes, support or are connected with said intermediate floor.

28. The fluid treatment system of claim 21, wherein standardized U-carriers are used as the grooved baffle element.

29. The fluid treatment system of claim 21, wherein the bulk material sliders on the groove walls are arranged against the interior side of at least one baffle element with little clearance or flush.

30. The fluid treatment system of claim 21, wherein an edge of the bulk material slider touching the at least one grooved baffle element is made out of a material other than the remainder of the slider.

31. The fluid treatment system of claim 30, wherein the material other than the remainder of the slider is a brush material.

* * * * *